April 9, 1963   G. C. D. MAGNAVITA   3,084,775
CENTRIFUGAL CLUTCH
Filed April 14, 1961

INVENTOR

George C. D. Magnavita

3,084,775
CENTRIFUGAL CLUTCH
George C. D. Magnavita, 868 E. Lincoln Highway,
Langhorne, Pa.
Filed Apr. 14, 1961, Ser. No. 103,692
3 Claims. (Cl. 192—105)

This invention relates to machine elements and, more particularly, to a power transmitting, wedge driven, centrifugal clutch.

It is an object of the present invention to provide a centrifugally operated clutch mechanism for transmitting power from one shaft to another which is extremely efficient and smooth in operation.

Still another object of the present invention is to provide a centrifugal clutch of the above type which will provide for the smooth transmission of power from one driving element to another driven element, and which will require minimum maintenance during prolonged periods of use.

Other objects of the invention are to provide a centrifugal clutch bearing the above objects in mind, which is of simple construction, has a minimum number of parts, is inexpensive to manufacture, and efficient in operation.

For other objects and for a better understanding of the invention, reference may be had to the following detailed description, taken in conjunction with the accompanying drawing, in which.

Figure 1:
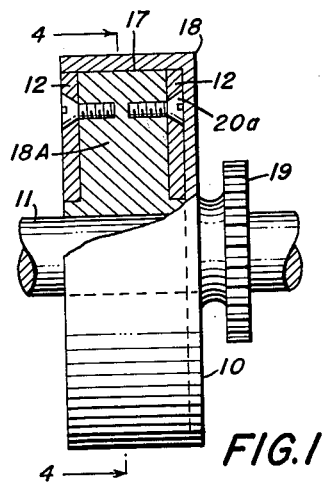
FIGURE 1 is a front elevational view, with parts broken away, of a clutch assembly made in accordance with the present invention.
Figure 2:
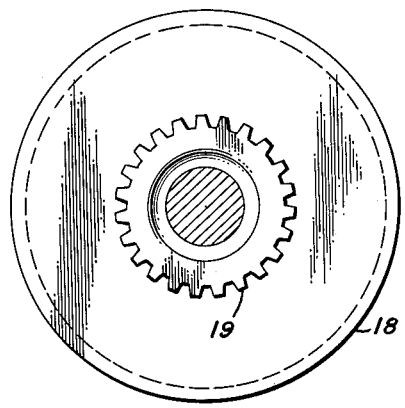
FIGURE 2 is a right end elevational view of the assembly shown in FIGURE 1.
Figure 3:
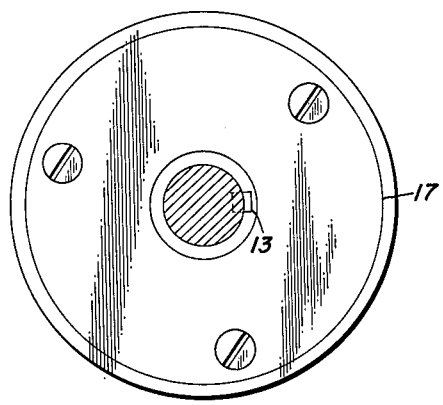
FIGURE 3 is a left end elevational view of the device shown in FIGURE 1.
Figure 4:
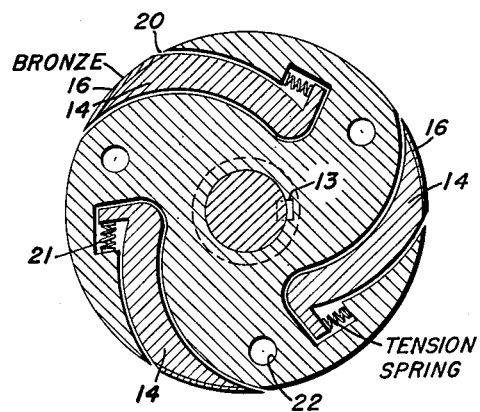
FIGURE 4 is a transverse cross sectional view of spider taken along line 4—4 of FIGURE 1.

Referring now more in detail to the drawing, a centrifugal clutch assembly 10 made in accordance with the present invention is shown to include a driving shaft 11 having a pair of circular plates 12 secured thereupon in spaced apart parallel relationship by a key 13 for rotation with the driving shaft 11. A spider 18A having spiral pockets 20 connected to the plate 12 by means of screws 20A threaded in openings 22 of the spider shown in FIG. 9 supports the centrifugal lever arms 14. The outermost end of each such element 14 is provided with a bronze friction surface 16 for engagement with the facing surface 17 of a drum 18 secured upon the driving shaft 11. The drum 18 has a driven gear 19 secured thereto which may be employed as the power take off.

Individual tension springs may be used to continguously bias the lever arms 14 toward an inwardly retracted position. However, in response to rotation of the driving shaft 11 at a speed above a predetermined value, centrifugal force will urge the outermost ends of the levers 14 outwardly into power transmitting engagement with the drum 18, thus effecting rotation of the driven gear 19. Thus, power is transmitted only during rotation of the driving shaft 11 above a selected speed, and as soon as such speed is reduced below such predetermined value, the transmission of power between the driving and driven members is interrupted. Thus, this device provides for the continuous and smooth flow of power from one member to the other.

For maintenance purposes, it is only necessary to remove the drum 18 to gain access to the friction elements 16 of the levers 14. It is to be understood, of course, that this clutch can be made in any size.

While various changes may be made in the detail construction, it shall be understood that such changes shall be within the spirit and scope of the present invention, as defined by the appended claims.

What I claim as new and desire to protect by Letters Patent of the United States is:

1. A clutch mechanism comprising, in combination a driving shaft, a driven member, a spider secured to the driving shaft, said spider having spiral like pockets therein intersecting the periphery thereof, spiral like shoes within said pockets, said shoes having a leading and trailing end, a metallic lining secured to said leading end, an abutment on said trailing end, spring means located in said pocket, between the abutment and the wall of said pocket, a circumferential flange extending from said driven member and encompassing said spider whereby upon attainment of a predetermined speed of the drive shaft, said shoes will move outwardly into engagement with said flange to connect said driving shaft and driven member together for rotation.

2. The clutch defined in claim 1 wherein said metallic lining is bronze.

3. The clutch defined in claim 2 wherein end plates are provided for said spider, securing means mounting said plates to each side of said spider whereby the shoes are maintained in said pockets against lateral movement.

References Cited in the file of this patent

UNITED STATES PATENTS

| | | |
|---|---|---|
| 2,286,461 | Burno | June 16, 1942 |
| 2,836,275 | Grassmuck | May 27, 1958 |
| 2,947,399 | Moore et al. | Aug. 2, 1960 |